No. 737,958. PATENTED SEPT. 1, 1903.
J. PFEIFER.
CHANGE MAKER.
APPLICATION FILED SEPT. 2, 1902.
NO MODEL. 9 SHEETS—SHEET 1.

Fig. 1

Witnesses
F. Llewellyn Walker
Clifton P. Grant

INVENTOR
John Pfeifer
BY Staley & Bowman
ATTORNEYS

No. 737,958. PATENTED SEPT. 1, 1903.
J. PFEIFER.
CHANGE MAKER.
APPLICATION FILED SEPT. 2, 1902.
NO MODEL. 9 SHEETS—SHEET 3.

No. 737,958. PATENTED SEPT. 1, 1903.
J. PFEIFER.
CHANGE MAKER.
APPLICATION FILED SEPT. 2, 1902.
NO MODEL. 9 SHEETS—SHEET 4.

No. 737,958. PATENTED SEPT. 1, 1903.
J. PFEIFER.
CHANGE MAKER.
APPLICATION FILED SEPT. 2, 1902.
NO MODEL. 9 SHEETS—SHEET 6.

WITNESSES: INVENTOR

No. 737,958. PATENTED SEPT. 1, 1903.
J. PFEIFER.
CHANGE MAKER.
APPLICATION FILED SEPT. 2, 1902.
NO MODEL. 9 SHEETS—SHEET 7.

WITNESSES:

INVENTOR
John Pfeifer
BY Staley & Borrman
ATTORNEYS

No. 737,958. PATENTED SEPT. 1, 1903.
J. PFEIFER.
CHANGE MAKER.
APPLICATION FILED SEPT. 2, 1902.
NO MODEL. 9 SHEETS—SHEET 9.

WITNESSES:
T. Llewellyn Walker
Clifton P. Grant

INVENTOR
John Pfeifer
BY Staley & Bowman
ATTORNEYS

No. 737,958. Patented September 1, 1903.

UNITED STATES PATENT OFFICE.

JOHN PFEIFER, OF SPRINGFIELD, OHIO, ASSIGNOR TO MAST, FOOS & COMPANY, OF SPRINGFIELD, OHIO, A CORPORATION OF OHIO.

CHANGE-MAKER.

SPECIFICATION forming part of Letters Patent No. 737,958, dated September 1, 1903.

Application filed September 2, 1902. Serial No. 121,726. (No model.)

*To all whom it may concern:*

Be it known that I, JOHN PFEIFER, a citizen of the United States, residing at Springfield, in the county of Clark and State of Ohio, have invented certain new and useful Improvements in Change-Makers, of which the following is a specification.

My invention relates to a money-changer for automatically making change. While it may be employed in any way within the scope of its usefulness, it will be found a ready means to make up pay-rolls, the machine being so constructed as to accurately and quickly discharge the proper amount of each employee's wages, but its larger field of usefulness will probably be found in sales departments, wherein when a larger amount is tendered than the purchase the machine can be operated to automatically deduct the amount of the purchase from the amount tendered and accurately discharge the difference in change.

My invention is an improvement upon the devices set forth in Letters Patent No. 619,786, granted to me February 21, 1899, the object of my present invention being to simplify the parts, give a more perfect construction, and better service under all conditions of use.

A further object is to provide a locking device whereby a purchase-key cannot be operated until after a cash-key has been depressed and then only of a like and less denomination than the cash-key so depressed.

It has been found that the depression of certain cash and purchase keys of like denomination do not operate to make corresponding divisional amounts, and in such cases I provide means so that when a purchase-key is depressed it returns all the discharging devices to inoperative position. It has likewise been found that certain cash-keys in combination with certain purchase-keys of different denominations will not normally move the proper divisional operating devices to discharge the correct change, and I provide means whereby when such keys are operated their connecting devices are so changed as to make the proper division.

It will further appear that my invention may be employed in connection with cash-registers of any well-known type now in general use.

My invention consists of the constructions and combinations hereinafter described, and set forth in the claims.

In the accompanying drawings, which form a part of this specification, Fig. 4 shows means of bringing the normally inoperative discharging devices into operative position and for returning same to inoperative position. Figs. 5, 6, 7, and $7^a$ are details of the discharging devices.

Like parts are represented by similar letters of reference in the several views.

In the drawings, $a\ a$ represent the supporting-frame, which may be inclosed in any suitable case, accessible only to the proprietor.

At one side of the machine I provide an outwardly-projecting shelf $a'$, on which I mount a series of coin-holders. In my present machine I employ three independent banks of operating-keys, one for pennies, there being five coin-holders—namely, $a^2$, $a^3$, $a^4$, $a^5$, and $a^6$ for pennies; one bank for five cents and multiples of five, there being six holders for this purpose—namely, $a^7$ and $a^8$, each for five-cent pieces; $a^9$ and $a^{10}$ for dimes, $a^{11}$ for quarters, and $a^{12}$ for half-dollars; and $a^{13}$ is the dollar-holder, connected with the third and last bank of operating-keys above referred to. In mounting the coin-holders on the shelf $a'$ I preferably provide a base $a^{14}$ for said holders to rest on said shelf, said base having depressions $a^{15}$ under each holder, up to and including fifty cents, adapted to pass a single coin of the denomination under which it is placed. A depression or opening $a^{16}$ under the dollar-holder is adapted to pass more than one coin of that denomination, as will be hereinafter described.

Within the frame $a$, immediately in the rear of the shelf $a'$, there is an inwardly-projecting shelf $a^{17}$, which carries a series of slides $a^{18}$, one for each coin-holder, adapted to pass through an opening in the side of the frame $a$ and through the depressions $a^{15}$ and $a^{16}$ to discharge a single coin from the holders. These coin-discharge slides may be operated in any suitable manner, but I have shown and will describe a preferred form.

On a cross-plate $a^{19}$, fixed to the respective sides of the machine and having a longitudinal depression therein, I mount a slide $a^{20}$, to which I attach at right angles thereto a plate $a^{21}$, which extends immediately underneath all the discharging slides $a^{18}$, so as to engage with plungers $a^{30}$ when said plungers are depressed below said slides, as hereinafter described, and pins $a^{34}$ are engaged by the return movement of said plate $a^{21}$. A pinion $a^{22}$, pivoted on the plate $a^{19}$, is adapted to mesh with a rack $a^{23}$, fixed on the slide $a^{20}$, and a rack $a^{24}$, slidingly mounted in a frame $a^{25}$, is also adapted to mesh with said pinion, so that when an operating-lever $a^{26}$, fixed on a shaft 1, journaled in the side frames of the machine and having a link $a^{27}$ pivotally connected with the rack $a^{24}$, is moved the plate $a^{21}$, which extends under the discharging-slides, will be moved and said slides will also be moved to discharge, as hereinafter described. A spring $a^{28}$, fixed to the plate $a^{19}$ and to the slide $a^{20}$, will return the operating devices to normal inoperative position, as will hereinafter more fully appear.

On each of the discharging-slides $a^{18}$ I mount a cylinder $a^{29}$, through each end of which there is extended the spring-actuated plunger $a^{30}$, said plunger being adapted to be pressed so as to extend below said slides. Above each of said plungers and normally resting thereon there is a hinged plate $a^{31}$, having on its upper side a cam-face $a^{32}$ with a projection $a^{33}$, and above each of said cams and adapted to contact therewith is an arm or projecting finger $b^6$, each one of which is fixed to a shaft or bar extending transversely in the machine and journaled in the side frames thereof. There is one of these bars for each coin-discharge except the dollar-discharge, which has more, to correspond with the additional coins that may be discharged therefrom, and for the sake of convenience I mark those for the penny-bank $b$, $b'$, $b^2$, $b^3$, and $b^4$, those for the five and multiples-of-five bank $b^5$, $b^{5x}$, $b^{10}$, $b^{10x}$, $b^{25}$, and $b^{50}$, thus making the numeral of the exponent to correspond with the denomination of the coin in the coin-holder with which it is connected, and the transfer-bars for the dollar-bank are marked $b'^y$, $b^{2y}$, $b^{3y}$, $b^{4y}$, and $b^{5y}$.

Figure 1:
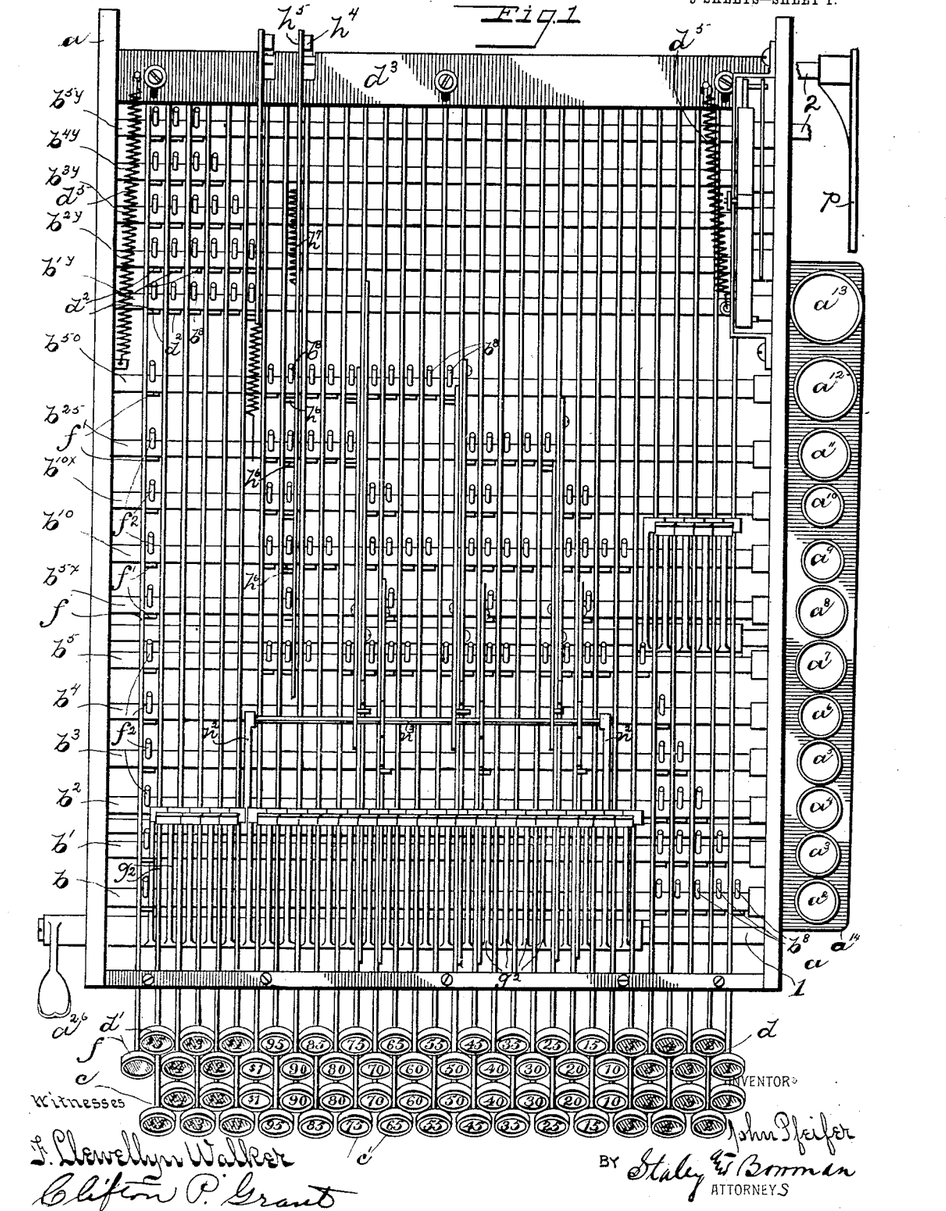
Figure 1 is a plan view with the cover removed of a machine embodying my invention.
Figure 2:
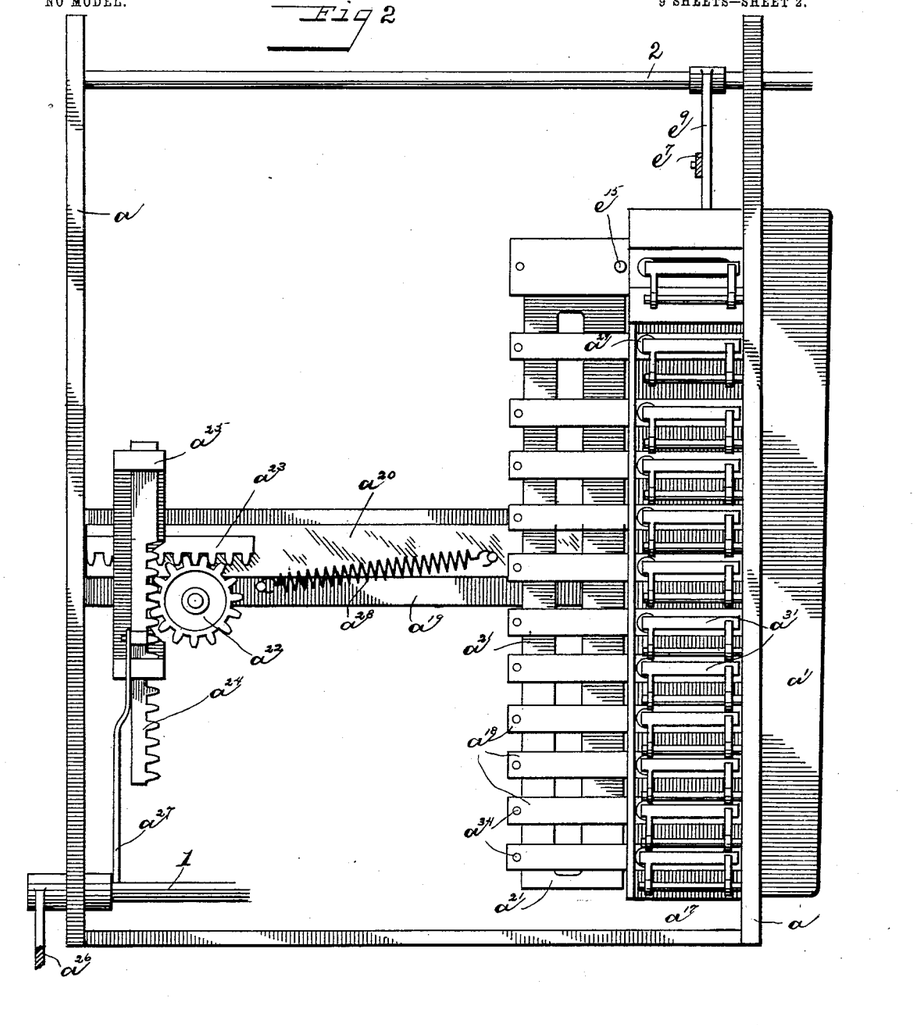
Fig. 2 is a view of the discharge-operating mechanism.
Figure 3:
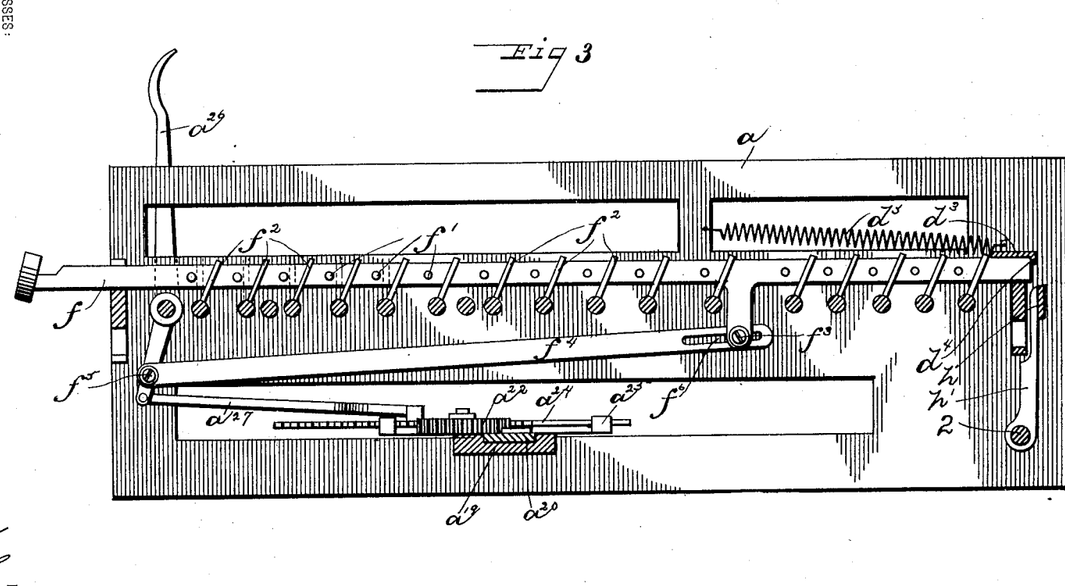
Fig. 3 is a view of the discharge-operating mechanism, also a key-rod to throw all the discharge-operating mechanism into inoperative position.
Figures 4, 5, 6, 7, 7A:
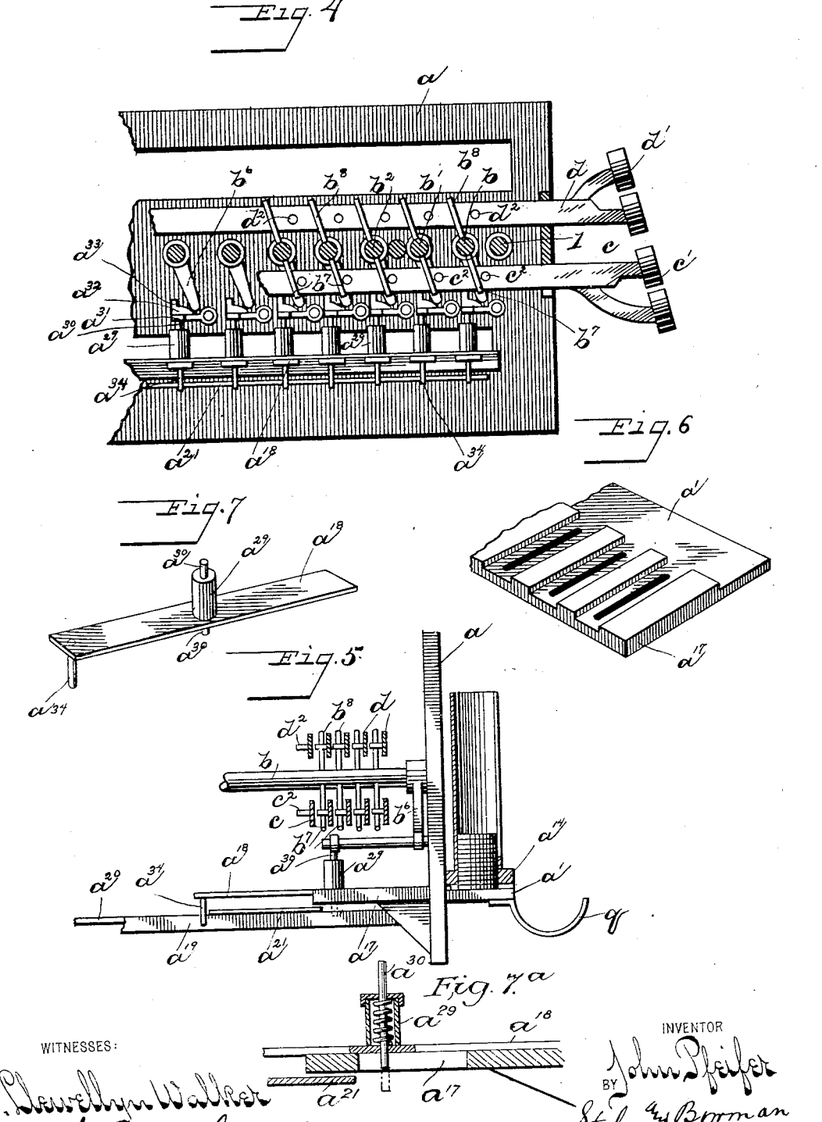

I now come to a consideration of the keys or key-rods and their connection with the coin-discharging devices. As hereinbefore stated, for the purpose of illustration I have shown a machine employing three independently-operated banks of keys, one bank dealing with dollars alone, another bank with five cents and multiples of five up to and including a dollar, and a bank devoted exclusively to pennies. Each bank has two series of keys, equal in number, arranged one above the other. The lower series $c$ I will designate as "cash-keys" and the upper series $d$ as "purchase-keys," although, as will be seen, the positions may be reversed. The keys $c$ and $d$ are provided with the usual push-buttons $c'$ and $d'$, and each button of one series bears a numeral to correspond with a like numeral on a button of the other series just above it, as shown in Fig. 1. Each key is connected to one or more of the coin-discharging devices. If to only one, it is of like amount, and if to more than one their total equals the amount of the numeral on the key. Each series of keys in the pennies-bank at the right of the machine is marked from "1" to "5," respectively. Each series in the five and multiples-of-five bank, forming the middle bank, is marked from "5" to "95," as shown, and this bank also includes a dollar-key, which operates to discharge a dollar in fractional amounts, and each series in the dollar-bank at the left of the machine is marked from "1" to "5," respectively.

The keys $c$ and $d$ I have preferably shown as rods extending longitudinally through the machine, sliding in apertures in the front and rear sides of the frame, the cash-rods $c$ passing immediately under and the purchase-key rods $d$ passing immediately over the transverse bars $b$ $b'$, &c., of each discharging device. The transverse bars I provide with arms $b^7$ and $b^8$, fixed to and extending below and above said bars, the downwardly-projecting arms $b^7$ being in the path of the horizontally-extending pins $c^2$ of the cash-key rod $c$, and the upwardly-projecting arms $b^8$ being in the path of the horizontally-extending pins $d^2$ of the purchase-key rods $d$. The arrangement is such that when a cash-key rod of any denomination present in the machine is depressed the pins $c^2$ of said rod are arranged to contact with the arms $b^7$ of such of the transverse bars $b^5$ $b^{10}$, &c., as will when added together equal the amount of the key depressed. For example, if the ninety-five-cent cash-key rod be depressed the pin $c^2$ of this rod will contact with and move the arms $b^7$ of the transverse bars $b^{50}$, $b^{25}$, $b^{10}$, $b^5$, and $b^{5\times}$, which will partially rotate said bars, turn the hinged plates $a^{31}$, and thereby depress the plungers $a^{30}$ in the path of the plate $a^{21}$, which is moved by the operating-lever, as hereinbefore described. The plungers being on the discharge-slides $a^{18}$ and the connections just described from the transverse bars being only to the slides and their respective coin-holders of like denomination with said bars the operation is such as to discharge the amount in change equal to the key depressed. The movement of the finger $b^6$ is limited by the projection $a^{30}$. As each of the banks is operated on the same principle and a description of the dollars and pennies banks would be the same as I have just described, it will be sufficient to say if change to the amount of three dollars and ninety-seven cents is desired it is only necessary to depress the following-named cash-keys: "$3" of the dollar-bank, "95¢" of the five and multiple-of-five bank, and "2¢" of the penny-bank.

Having described the operation of the cash-keys to discharge change in predetermined divisional amounts, which when added together equal the amount of the cash-key depressed, it will be seen I have provided a machine whereby a pay-roll may be quickly and accurately distributed and for like operations, and I will now proceed to describe the operation of the purchase-keys.

In a sales department where an amount is tendered greater than the amount of the purchase the purchase-keys, in combination with the cash-keys and their associated parts, form the means of automatically computing and discharging the difference in change. The operation will be perhaps best understood by way of an example. For instance, a sale amounting to ninety-seven cents has been made and one dollar tendered. By depressing the "95¢" cash key in the middle bank the pins $c^2$ on its rod will contact with and move the arms $b^7$ on the transverse bars $b^{50}$, $b^{25}$, $b^{10}$, $b^5$, and $b^{5\times}$, which will depress the plungers on the discharge-slides $a^{18}$ of the coin-holders of like denomination, as hereinbefore described, and by further depressing the cash-key 5 of the penny-bank it will operate in like manner to depress the plungers on the discharging-slides $a^{18}$ of the five penny-holders. Thus by depressing the two keys named the plungers on the discharging-slides for the respective coin-holders to the amount of one dollar have been depressed in the path of the bar $a^{21}$. Now as the purchase amounted to ninety-seven cents the operator will depress the "95¢" purchase key, the pins $d^2$ of which will contact with and move the arms $b^{18}$ of the transverse bars $b^{50}$, $b^{25}$, $b^{10}$, $b^5$, and $b^{5\times}$ in a reverse direction, and thereby return to normal inoperative position the plungers on the discharging-slides $a^{18}$. Then depressing two of the penny-purchase keys they will, by like operation, return two of the plungers on the penny-discharging slides. It will be seen that the coin-discharge devices having been brought into operative position to the amount of one dollar and returned to inoperative position to the amount of ninety-seven cents it leaves only three of the penny-discharging devices in operative position, and by moving the operating-lever they will be operated to discharge three pennies—the correct amount of change.

Figure 18:
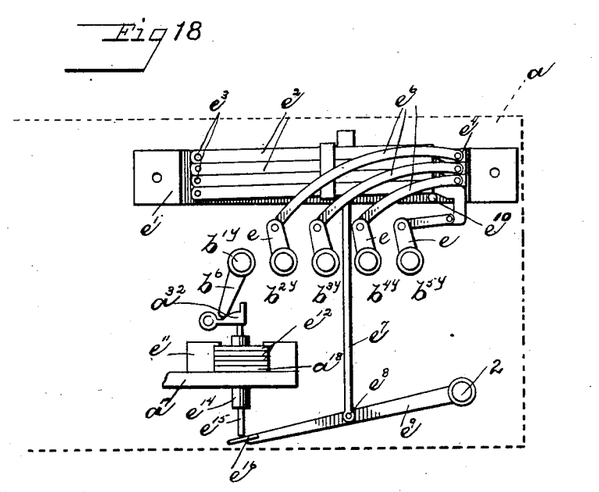
Figs. 18, 19, 20, and 21 are details of devices whereby two or more coins from the same holder may be discharged at one time.
Figure 19:
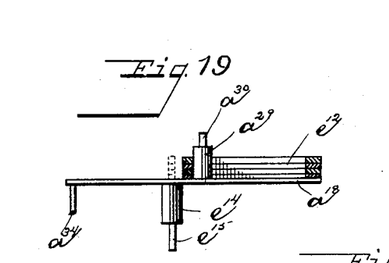
Figure 20:
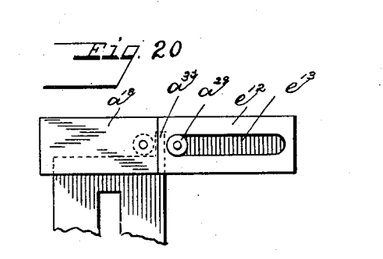
Figure 21:
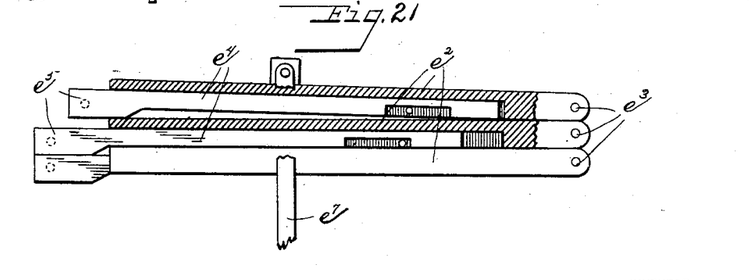
Figure 22:
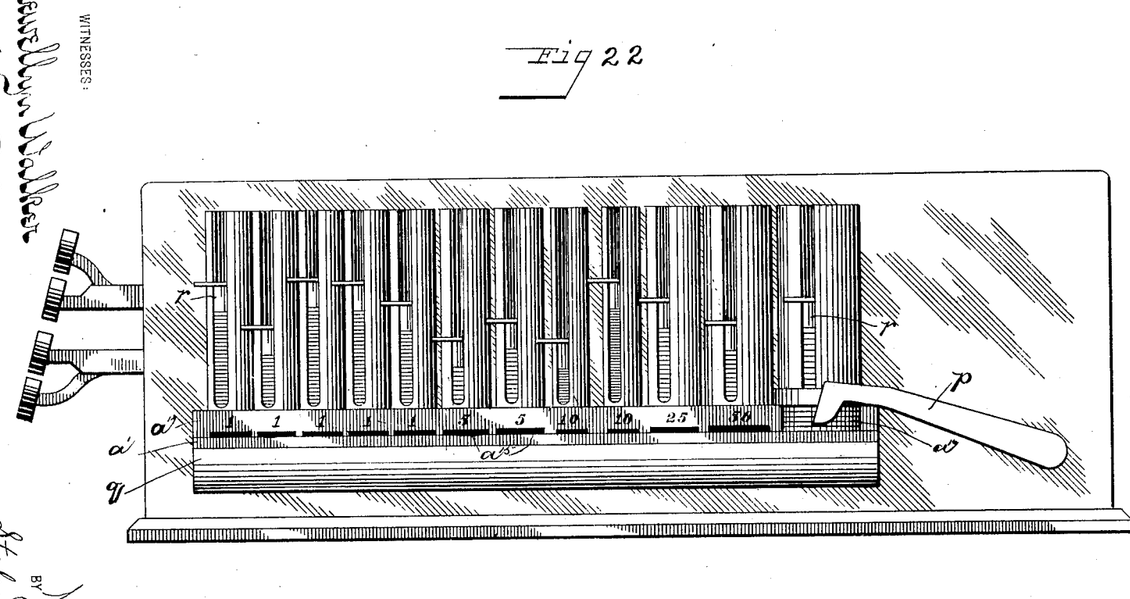
Fig. 22 is a side elevation of the machine, showing the coin-holders.
Figure 23:
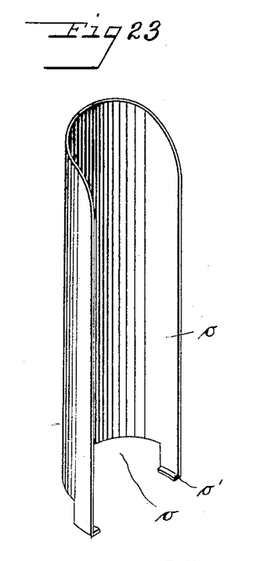
Fig. 23 is a detail of a coin-loader.
Figure 24:
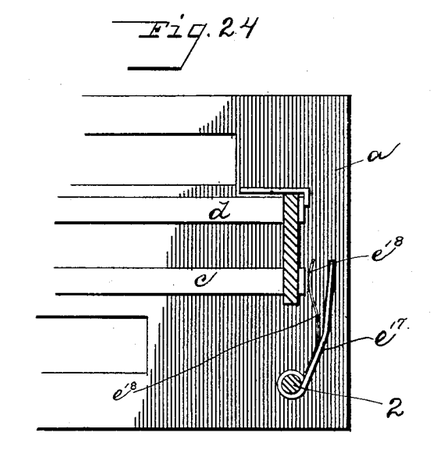
Fig. 24 is detail of device to assist in bringing discharging devices into operative position.
Figure 25:
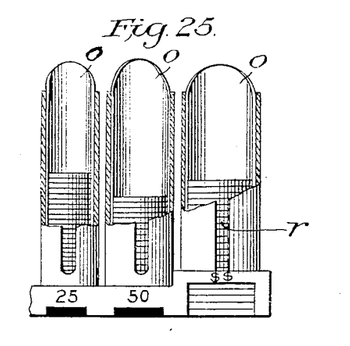
Fig. 25 is a detail showing the coin-loader in position in the holder.

As hereinbefore stated, the dollar-coin holder I have adapted to discharge more than one coin, which is accomplished in the following manner: A single coin is discharged by a plunger on the slide $a^{18}$, set by a transverse bar, which I have marked $b'^y$ in like manner as the other coin-holders; but the depression $a^{16}$ for this holder I make of such depth as to pass the number of coins desired, which is five in the machine I have illustrated, and I have provided additional transverse bars $b^{2y}$, $b^{3y}$, $b^{4y}$, and $b^{5y}$, the numerals of the exponent being the same as the numerals on the cash and purchase keys, said key-rods having pins $c^2$ and $d^2$ to engage with the arms $b^7$ and $b^8$ on said bars in like manner, as hereinbefore described, and near one end of each of said four bars I fix laterally-projecting arms $e$. Within one side of the frame $a$ and immediately above said arms I have fixed a casing $e'$, in which I place four parallel bars $e^2$, resting consecutively one on another, one end of said bars being pivoted at $e^3$ to said casing and the other end being free to move vertically. Within each of said bars I provide a slide $e^4$, having an enlarged beveled end $e^5$, normally extending beyond the end of the bar and below the upper surface of the next lower bar, the beveled end of the lowest slide extending below a pin $e^{10}$, as shown in Fig. 18. The beveled ends $e^5$ of said slides I pivot to the arms $e$ by connecting-links $e^6$. To the upper one of the four bars $e^2$ I pivot a link $e^7$, which in turn is pivoted at $e^8$ to an arm $e^9$ on the shaft 2. On the shelf $e^{17}$, immediately in the rear of the dollar-coin holder, I provide guides $e^{11}$, in which the usual discharge-slide $a^{18}$ for the dollar-coin holder moves. On this slide $a^{18}$ and within the guides $e^{11}$ I mount consecutively one on another four plates $e^{12}$, each of equal thickness with the coin to be discharged, and I provide longitudinal slots $e^{13}$ in said plates for the movement of the cylinder $a^{29}$ in operating the slide $a^{18}$. On the under side of the slide $a^{18}$ I fix a cylinder $e^{14}$, having a plunger $e^{15}$ therein, the lower end of which normally rests on a plate $e^{16}$, secured to the arm $e^9$. Now when a cash-key for more than one dollar is depressed—say the "$2" key—its key-rod will by the pin-and-arm connections hereinbefore described turn the transverse bar $b^{2y}$, which through the arm $e$ and its connecting-link $e^6$ draws the slide $e^4$ within the upper bar, and the beveled end $e^5$, contacting with the next lower bar, will lift the upper bar, Fig. 21, and the link $e^7$, being connected with said bar, will through the arm $e^9$ and its plate $e^{16}$, which contacts with the plunger $e^{15}$, elevate said plunger through the slide $a^{18}$ a sufficient distance to engage the lowest of the slides $e^2$, which when the discharge is operated will discharge two dollars, the shelf $a^{17}$ having a transverse slot for the movement of the cylinder $e^{14}$. The plate $a^{21}$ of the actuating device is formed with a shoulder $a^{35}$ to actuate the dollar-slide $a^{18}$ when only one dollar is discharged. As the bars $e^2$ rest consecutively one upon another and upon the pin $e^{10}$, the top bar being for the discharge of two dollars and the succeeding ones for three, four, and five dollars, it will be seen one or more of these will be operated according to the key depressed—as, for instance, if the "$5" key is depressed it will operate to lift all the bars $e^2$, and the plungers $e^{15}$ will be elevated to engage all the plates $e^{12}$ to discharge five dollars. Furthermore, if the "$5" cash key is depressed and then a purchase-key of less denomination—say the "$2" key—it will operate through the transverse bars to release two of the bars $e^2$, which will drop and lower the plunger $e^{15}$ the thickness of two plates $e^{12}$, and thereby set the discharge for the difference—three dollars. To relieve the strain on the connections for the discharge of four and five dollars, I have provided an arm $e^{17}$, having a spring $e^{18}$ on the shaft 2 in the rear of the key-rods for four and five dollars, so that when those keys are depressed, as described, they will contact with said spring-arm, and thereby turn the shaft 2 and by reason of the arm $e^9$ being secured on said shaft assist in the operation of fixing the discharge for the amount stated. An arm $p$ on the shaft 2 is adjusted outside of the dollar-discharge opening, so as not to permit the discharge of a greater number of coins than the number on the key depressed.

A key-rod $f$, which extends longitudinally through the machine, I preferably place at the left-hand side of the machine and provide with laterally-extending pins $f'$ to engage arms $f^2$ on each of all the transverse bars in each bank of the machine, so that by depressing this key-rod every one of the coin-discharging devices will be returned to inoperative position, and at $f^3$ I pivot to this key-rod a link $f^4$, which is pivoted at its opposite end to the operating-lever at $f^5$, so that when the lever $a^{26}$ is moved to operate the discharging devices just before it reaches the limit of its stroke in that direction said link will push said rod rearwardly, and its laterally-projecting pins $f'$ will engage and move the arms $f^2$ on each of the transverse bars, thereby turning said bars and releasing the plungers, so that the discharge-slides cannot operate. The pivot $f^3$ moves in the slot $f^6$ until the operating-lever nears the limit of its stroke, as described.

A plate $d^3$, extending across the machine and resting on the purchase-key rods, has a shoulder $d^4$, extending across the rear ends of the said keys, and said plate is connected to the sides of the machine-frame by springs $d^5$, so that when a purchase-key is depressed it will immediately return to normal position.

Figures 9, 10, 11, 12:
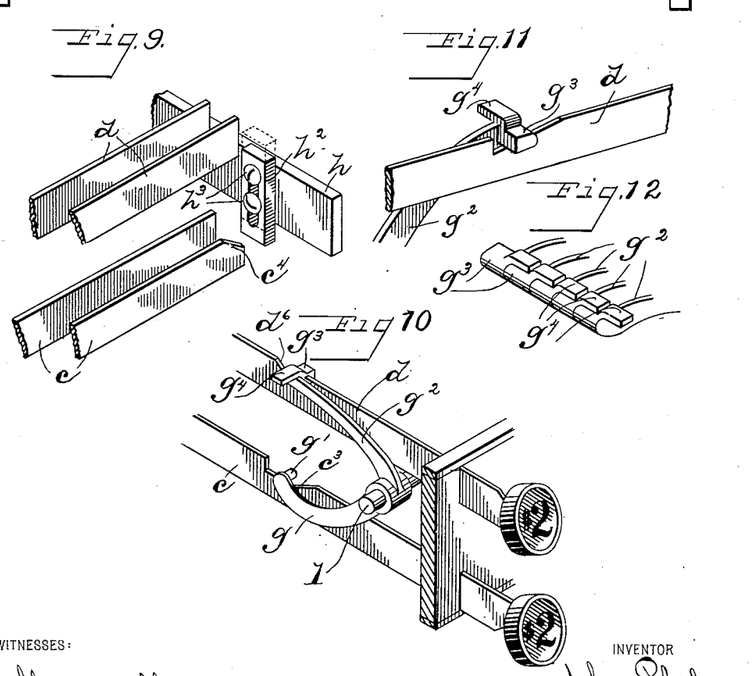
Fig. 9 is a detail of devices at the rear end of certain keys.
Figs. 10, 11, and 12 are details of locking devices for purchase-keys.

For the purpose of preventing the operation of the purchase-keys until after a cash-key has been depressed and also to prevent the operation of a purchase-key of greater denomination than the cash-key which has been depressed, I provide a construction which when a cash-key has been depressed will permit the operation of only such purchase-key as is of like or less denomination. I have shown a locking device in Figs. 1, 10, 11, and 12 of the drawings wherein the shafts 1 and 4, journaled in the respective sides of the main frame, each carry a yoke journaled thereon, one arm, $g$, of which is provided with a laterally-extending pin $g'$, which rests in a beveled notch $c^3$ of the cash-key $c$, and the other arm, $g^2$, of which has a lateral projection $g^3$ resting in a beveled notch $d^6$ of the purchase-key $d$ of like denomination directly over said key, so that when a cash-key is depressed the pin $g'$, traveling up the incline of the beveled notch $c^3$, will lift the projection $g^3$ out of the beveled notch $d^6$ of the purchase-key and permit its operation. It will be understood I provide a yoke such as described for each cash and purchase key of like denomination, and by providing each yoke with a projection $g^4$, overlapping the projection $g^3$ of the next higher denomination, when a cash-key of any denomination is depressed it will lift all the yokes of the keys of a less denomination, thereby releasing the keys of less denomination, while the purchase-keys of a higher denomination will remain locked. (See Figs. 10, 11, and 12.) It will of course be understood that these locking-yokes operate in each bank independent of the other banks. Fig. 10 shows the yoke on shaft 1, but the yokes are arranged in like manner on shaft 4.

Figure 8:
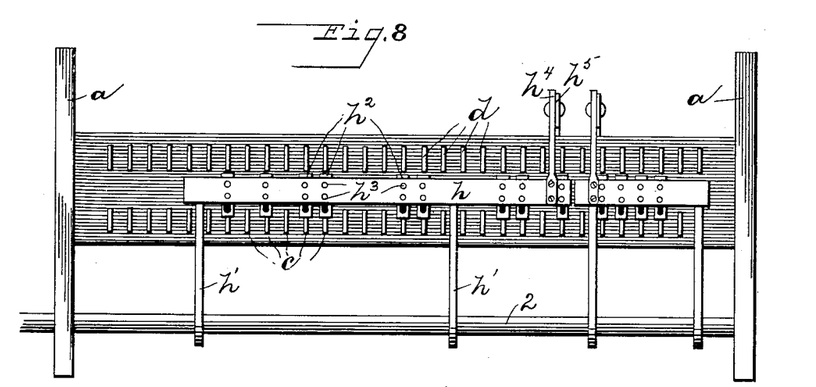
Fig. 8 is a rear elevation of the machine.

It sometimes happens that an operator will thoughtlessly depress a cash-key when the purchase is equal to the amount tendered and in some cases the depression of a purchase-key of like denomination will return the plungers of the discharge-slides that have been depressed by the depression of said cash-key; but with certain keys this is not true—namely, the ten-cent, twenty-cent, thirty-cent, thirty-five-cent, fifty-five-cent, sixty-cent, eighty-cent, eighty-five-cent, and ninety-five-cent keys. To correct this, I provide a plate $h$, extending across the middle bank of keys adjacent to the rear end of said key-rods, said plate being journaled on the shaft 2 by arms $h'$. On the plate $h$ I mount slides $h^2$, said slides being slotted to move vertically on pins $h^3$. These slides $h^2$ by gravity normally rest so that they will be in the path of the cash-key rods and out of the path of the purchase-key rods. The rear end of these cash-keys are beveled at $c^4$, so that when depressed said bevel will lift the slides $h^2$ into the path of the purchase-key of like denomination, so that when said purchase-key is depressed its rear end will contact with said slide and move the plate $h$. This plate $h$ I provide with an upwardly-extending arm $h^4$, to which I pivot a rod $h^5$, extending longitudinally with the keys of said bank and having laterally-extending pins $h^6$ to engage the arms $b^8$ of each transverse bar in said bank, so that the rearward movement of the plate $h$ will return the plungers on all the discharge-slides in said bank. It will thus be seen that when a cash-key is thoughtlessly depressed, as stated, the depression of a purchase-key of like denomination will correct the matter by returning all the coin-discharge slides in said bank to inoperative position, and a tension-spring $h^7$, attached to said rod $h^5$ and hooked over one of the transverse bars, as shown, will draw the parts back into normal position. (See Figs. 1, 8, and 9.) This arrangement is not required in the penny-bank, but it is needed in the dollar-bank as to all except the "$5" key, and I have shown in the drawings the same devices applied to the dollar-bank; but as they are the same and operated in the same way it is unnecessary to repeat the description.

Figure 13:
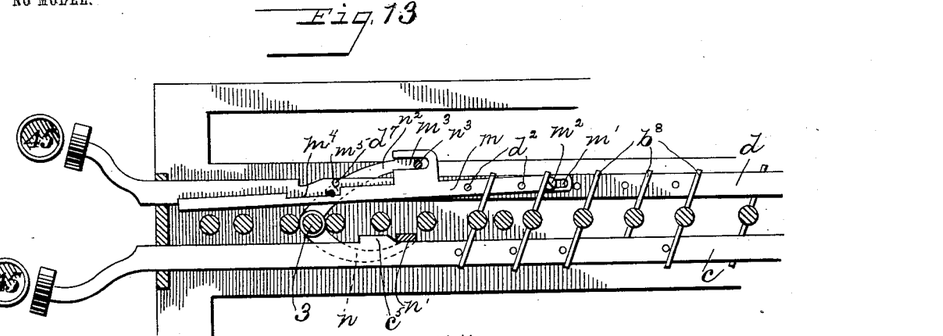
Figs. 13 and 14 are details of certain keys with attachments to change their operation.
Figure 14:
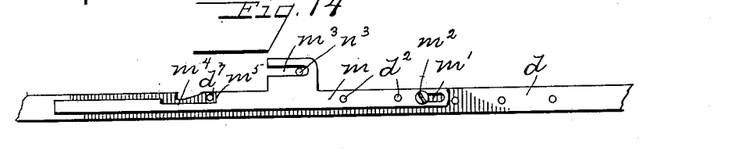
Figure 15:
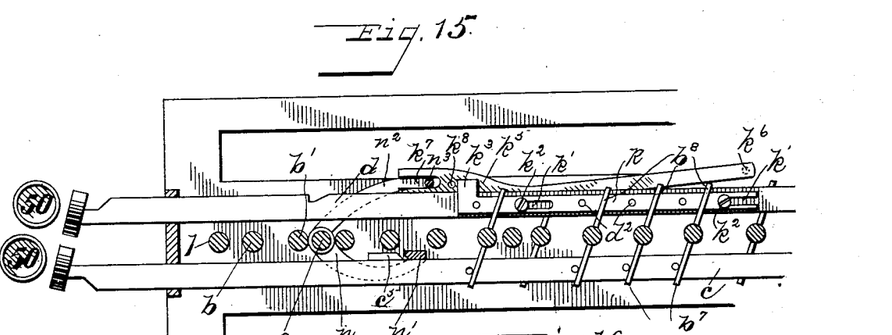
Figs. 15, 16, and 17 are details of certain other keys with attachments to change their operation.
Figure 16:
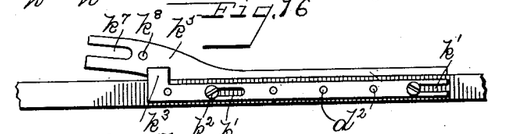
Figure 17:
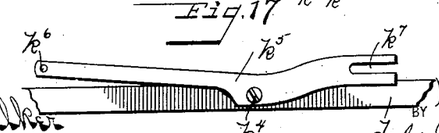

There are some combinations wherein the fractional parts or division of the amount represented by a cash-key and the fractional parts or division of the amount represented by a purchase-key in their normal operation do not correspond, so that the correct difference between the amounts represented by the two different keys will be discharged. This occurs in the present machine when the cash-keys "95," "70," and "45" and the purchase-keys "75," "70," "50," "45," "25," and "20" are operated in combination, and to correct this I provide on each of the purchase-keys "75," "50," and "25" (see Figs. 15, 16, and 17) a sliding-bar $k$, having slots $k'$ and movable longitudinally on bolts $k^2$, extending through said slots. These bars carry the pin $d^2$ to engage the arms $b^8$ of the transverse bars, and the forward end of the bar is provided with an upwardly-extending projection $k^3$. On the opposite side of each of said key-rods "75," "50," and "25" I pivot at $k^4$ a lever $k^5$, having one or more laterally-extending pins $k^6$ at its rear end to engage the arms $b^8$ of the transverse bars, and its forward end I provide with a slot $k^7$, and a pin $k^8$ is adapted to engage the projection $k^3$. On the keys "70," "45," and "20" (see Figs. 13 and 14) I provide a sliding bar $m$, having a slot $m'$ and movable longitudinally on a bolt $m^2$, extending through said slot. This bar I further provide with an upwardly-extending projection having a horizontal slot $m^3$. Said bar also has a depression $m^4$ with a shoulder $m^5$ and carries laterally-extending pins $d^2$ to engage the arms $b^8$ of certain of the transverse bars. A pin $d^7$ on the key-rod is adapted to engage the shoulder $m^5$ of the depression $m^4$. On a transverse shaft 3, journaled to the side frames, I mount two yokes, the lower arms $n$ of each of which are joined by a cross-bar $n'$, adapted to engage a beveled projection $c^5$ of each of the cash-keys "95," "70," and "45." The upper arms $n^2$ of each of said yokes are joined by a cross-rod $n^3$, (see Figs. 1, 13, and 15,) adapted to engage in the slot $k^7$ of the lever $k^5$ and the slot $m^3$ of the bar $m$. The operation is such that when any one of the cash-keys of a higher denomination other than "95," "70," and "45" is depressed the depression of the purchase-keys "75," "50," and "25" will operate as follows: The pin $k^8$ on the lever $k^5$ will engage the projection $k^3$ of the bar $k$ and move said bar, the pins $d^2$ engaging the arms $b^8$ of such of the transverse bars as will normally divide the amount of the key depressed, which in case the "50¢" key is depressed would be twenty-five, ten, ten, and five; but if the "95," "70," or "45" cash-key be depressed the beveled projection $c^5$ of said keys engaging the cross-bar $n'$ of the yoke will by the cross-rod $n^3$ in the slots $k^7$ lift the forward end of the lever $k^5$, so that the pin $k^8$ will pass the projection $k^3$ and the bar $k$ will not be moved, and consequently the pins on said bar will not move any of the transverse bars; but the lever $k^5$ will move longitudinally with the key, and the rear end of the lever $k^5$ being depressed the pins $k^6$ on said lever will engage the arms $b^8$ of such other transverse bars as will make the proper divisional amount, which in case the "50¢" key be depressed would be the single transverse bar $b^{50}$; but there are some cases wherein the likelihood of the amount tendered is so remote that provision has not been made in the present machine, to correct which it is only necessary to increase the number of coin-discharging devices operated in the same way—as, for instance, in the event of a division being required between seventy cents and twenty-five cents a duplicate of the twenty-five-cent coin-discharging devices with keys and connections, as herein shown and described, must be added, so that seventy cents can be divided to include twenty-five cents as a divisional amount. Now considering the "70," "45," and "20" purchase-keys, if one of them be depressed after the depression of a cash-key of higher denomination other than "95," "70," and "45" the operation is as follows: The pins $d^2$ immediately attached to the key-rod engage the arms $b^8$ of such transverse bars as will, when added together, equal the amount of the key depressed, which in case purchase-key "45" is depressed will be twenty-five, ten, and ten; but when the "95," "70," or "45" cash-key is depressed the cross-rod $n^3$ of the yoke will be elevated, as hereinbefore described, and as said rod extends through the slot $m'$ the bar $m$ will be lifted, the pin $d^7$ of the key-rod will engage the shoulder $m^5$ and move the bar $m$, so that the pins $d^2$ on said bar may operate against the arms $b^8$ of such transverse bars as will in addition to the operation of the pins $d^2$ directly on the key-rod make the correct divisional amount, which in case the "45" key is depressed will be $b^5$ and $b^{5\times}$.

In loading the coin-holders there is more or less difficulty caused by the coins tipping and sticking before they reach the bottom of the holder, which I obviate by providing a loader $o$, made of thin material, preferably metal, in segmental form, of such size as will hold the coin and slip within the coin-holder. The coin is first placed within the coin-loader resting on the inturned edge $o'$ at its base, and then the loader is inserted in the coin-holder, the slot $o^2$ at the base being equal to the coin-discharge depression in the base of the coin-holder for the passage of the coin discharged.

A trough $q$, attached to the shelf $a'$, forms a convenient means of catching the discharged coin, from which the coin may be readily removed.

A plug $r$ in each coin-holder resting on the coin will, when the coin in any holder is exhausted, drop to the bottom, close the discharge-opening, and thereby lock the discharging devices.

Having thus described my invention, I claim—

1. In a machine such as described, the combination with a series of cash-keys and a series of purchase-keys, of devices adapted to engage said cash and purchase keys, whereby each of said purchase-keys is locked until after a cash-key of like denomination is operated, substantially as specified.

2. In a machine such as described, the combination of a series of cash-keys and a series of purchase-keys, and means normally locking said purchase-keys adapted to be moved by the operation of said cash-keys and when so moved to unlock said purchase-keys, said means resuming locking position upon the return of said keys to normal position.

3. In a machine such as described, the combination of a series of cash-keys and a series of purchase-keys, a locking device for each of said purchase-keys adapted to be unlocked by the operation of a cash-key of like denomination and means whereby the unlocking of a purchase-key will unlock all the purchase-keys of a less denomination, substantially as specified.

4. In a machine such as described, the combination of a main frame, a shaft journaled in said frame, a series of cash-keys and a series of purchase-keys, yokes on said shaft adapted to engage keys of like denomination in the respective series and lock the purchase-keys and projections on each yoke adapted to engage the yoke of the next higher denomination, whereby the operation of a cash-key will unlock the purchase-keys of like and less denominations, substantially as specified.

5. In a machine such as described, the combination of a series of normally inoperative money-discharging devices, a series of cash-keys, a series of purchase-keys, intermediate connections between said keys and discharging devices, whereby the operation of a cash-key will bring discharging devices corresponding in amount with said cash-key into operative position and the operation of a purchase-key will return discharging devices corresponding in amount with said purchase-key into inoperative position, and means whereby when the operation of a cash-key is followed by the operation of a purchase-key of like denomination, all of the discharging devices brought into operative position by said cash-key will be returned to inoperative position, substantially as specified.

6. In a machine such as described, the combination of a series of normally inoperative money-discharging devices, a series of cash-keys, a series of purchase-keys, intermediate connections between said keys and discharging devices, whereby the operation of a cash-key will bring discharging devices corresponding in amount with said cash-key into operative position and the operation of a purchase-key will return discharging devices corresponding in amount with said purchase-key into inoperative position, and means, including a connection between keys of like denomination in the respective series, whereby when the operation of a cash-key is followed by the operation of a purchase-key of like denomination all of the discharging devices brought into operative position by said cash-key will be returned to inoperative position, substantially as specified.

7. In a machine such as described, the combination of a series of normally inoperative money-discharging devices, a series of cash-keys, a series of purchase-keys, intermediate connections between said keys and discharging devices, whereby the operation of a cash-key will bring discharging devices corresponding in amount with said cash-key into operative position and the operation of a purchase-key will return discharging devices corresponding in amount with said purchase-key into inoperative position, and means whereby when certain of said cash and purchase keys are operated in combination, said connections with the purchase-keys will be changed to return to inoperative position, money-discharging devices making a different division of the amount of the purchase-key so operated, substantially as specified.

8. In a machine such as described, the combination of a series of normally inoperative money-discharging devices, a series of cash-keys, a series of purchase-keys, intermediate connections between said keys and discharging devices, whereby the operation of a cash-key will bring discharging devices corresponding in amount with said cash-key into operative position and the operation of a purchase-key will return discharging devices corresponding in amount with said purchase-key into inoperative position, and means, including connections between certain cash and purchase keys whereby said keys, when operated in combination, will change the connections between said purchase-keys and discharging devices to return to inoperative position discharging devices making a different division of the amount of the purchase-key so operated, substantially as specified.

9. In a machine such as described, the combination of a series of normally inoperative money-discharging devices, a series of cash-keys, a series of purchase-keys, intermediate connections between said keys and discharging devices, whereby the operation of a cash-key will bring discharging devices corresponding in amount with said cash-key into operative position and the operation of a purchase-key will return discharging devices corresponding in amount with said purchase-key into inoperative position, and means, including devices mounted on certain of the purchase-keys and having connections with certain of the cash-keys, whereby said keys when operated in combination will change the connections between said purchase-keys and discharging devices to return to inoperative position devices making a different division of the amount of the purchase-key so operated, substantially as specified.

10. In a machine such as described, the combination of a series of money-holders, normally inoperative discharging devices for each of said holders, a series of cash-keys and a series of purchase-keys each having lateral projections thereon, a series of bars extending between said cash and purchase keys, having connections with said discharging devices, said bars also having oppositely-extending arms with which said key projections are adapted to engage to turn said bars in opposite directions, the engagement of each key being with such of said bars, that upon the operation of a cash-key, discharging devices corresponding in amount with said cash-key will be brought into operative position, and the operation of a purchase-key will return discharging devices corresponding in amount to said purchase-key into inoperative position, substantially as specified.

11. In a machine such as described, the combination of a series of money-holders, normally inoperative discharging devices for each of said holders, a series of cash-keys and a series of purchase-keys each having lateral projections thereon, a series of bars extending between said cash and purchase keys, having connections with said discharging devices, said bars also having oppositely-extending arms with which said key projections are adapted to engage to turn said bars in opposite directions, the engagement of each key being with such of said bars, that upon the operation of a cash-key, discharging devices corresponding in amount with said cash-key will be brought into operative position, and the operation of a purchase-key will return discharging devices corresponding in amount to said purchase-key into inoperative position, and means, independent of said keys, to actuate said discharging devices when they are brought into operative position, substantially as specified.

12. In a machine such as described, the combination of a series of normally inoperative money-discharging devices, a series of cash-keys, a series of purchase-keys, intermediate connections between said keys and discharging devices whereby the operation of a cash-key will bring discharging devices corresponding in amount with said cash-key into operative position, and the operation of a purchase-key will return discharging devices corresponding in amount with said purchase-key into inoperative position, and means, independent of said keys, to return all of said discharging devices to inoperative position, substantially as specified.

13. In a machine such as described, the combination of a series of normally inoperative money-discharging devices, a series of cash-keys, a series of purchase-keys, intermediate connections between said keys and discharging devices whereby the operation of a cash-key will bring discharging devices corresponding in amount with said cash-key into operative position, and the operation of a purchase-key will return discharging devices corresponding in amount with said purchase-key into inoperative position, and a special key adapted to return all of said discharging devices to inoperative position independent of the operation of said purchase-keys, substantially as specified.

14. In a machine such as described, the combination of a series of normally inoperative money-discharging devices, a series of cash-keys, a series of purchase-keys, intermediate connections between said keys and discharging devices whereby the operation of a cash-key will bring discharging devices corresponding in amount with said cash-key into operative position, and the operation of a purchase-key will return discharging devices corresponding in amount with said purchase-key into inoperative position, and means independent of said keys to actuate said discharging devices after the same have been set in operative position, said means being also adapted to return all of the discharging devices to inoperative position, substantially as specified.

15. In a machine such as described, the combination of a series of money-holders, normally inoperative discharging devices for each of said holders, a series of cash-keys and a series of purchase-keys, each having lateral projections thereon, a series of bars extending between said cash and purchase keys having connections with said discharging devices, said bars also having oppositely-extending arms with which said key projections are adapted to engage to turn said bars in opposite directions, the engagement of each key being with such of said bars, that upon the operation of a cash-key, discharging devices corresponding in amount with said cash-key will be brought into operative position, and the operation of a purchase-key will return discharging devices corresponding in amount with said purchase-key into inoperative position, a special key adapted to engage each of said bars, a mechanism to actuate said discharging devices when in operative position, a lever to operate said mechanism having a connection to said special key whereby all the 16. In a machine such as described, the combination of a money-holder, a series of cash-keys, a series of purchase-keys, a series of normally inoperative discharging-slides for said holder equal in thickness to the pieces of money to be discharged, a transverse bar having connections to one of said slides, and additional transverse bars having connections with the other slides, said last-named connections consisting in part of pivoted parallel bars resting one upon another with slides therein adapted to be moved to lift its parallel bar and the one or more above it according to the key depressed, said cash-keys being adapted to turn said transverse bars in one direction to set discharging-slides, corresponding in amount to the key depressed, in operative position, and said purchase-keys being adapted to turn said transverse bars in opposite directions to return discharging-slides corresponding in amount to the key depressed to inoperative position, and means to limit the number of pieces of money discharged to the number of discharging-slides set in operative position, substantially as specified.

17. In a machine such as described, the combination of money-holders and discharging devices therefor, of money-loaders formed to hold the money and to slide within said holders, said holder and loader having openings therein for the discharge of the money, substantially as specified.

18. In a machine such as described, the combination of two or more banks of keys representing different denominations of money, money-holders corresponding with the keys in said banks, normally inoperative discharging devices for each of said holders, intermediate connections from said keys to said discharging devices to bring said devices into operative position corresponding in amount to the key depressed, and an operating mechanism independent of said keys common to all said discharging devices to actuate said devices when brought into operative position, substantially as specified.

19. In a machine such as described, the combination of a series of cash-keys and a series of purchase-keys, said cash and purchase keys being of like denominations and divided into banks of different denominations, money-holders corresponding with said keys, normally inoperative discharging devices for each of said holders, intermediate connections from said cash-keys to said discharging devices to bring said devices into operative position corresponding in amount with the cash-key depressed, intermediate connections from said purchase-keys to said discharging devices to return into inoperative position said devices corresponding in amount with the purchase-key depressed, and an operating mechanism independent of said keys common to all said discharging devices to actuate said devices when brought into operative position, substantially as specified.

20. The combination with a money-holder and normally inoperative discharging devices therefor to discharge one or more pieces of money at a time, of a series of keys having connections to said discharging devices to bring said discharging devices into operative position, and auxiliary devices substantially as described to assist in said operation.

In testimony whereof I have hereunto set my hand this 20th day of August, A. D. 1902.

JOHN PFEIFER.

Witnesses:
OLIVER H. MILLER,
PERCY NORTON.